No. 870,274. PATENTED NOV. 5, 1907.
W. E. CAPERTON.
BEE GUM.
APPLICATION FILED MAY 15, 1907.
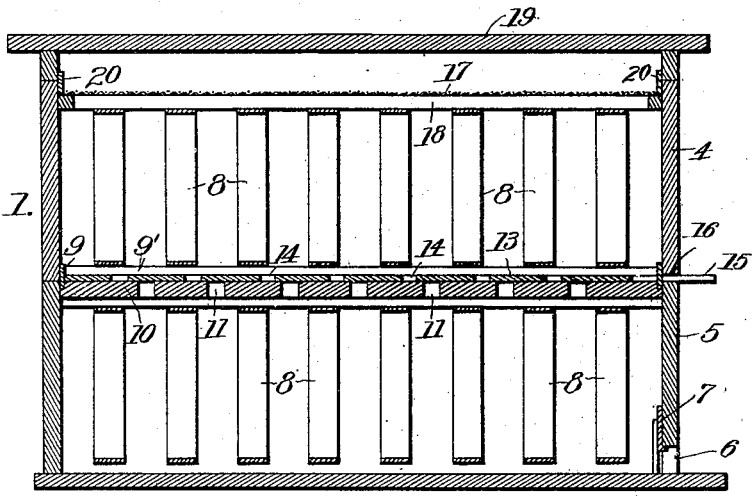
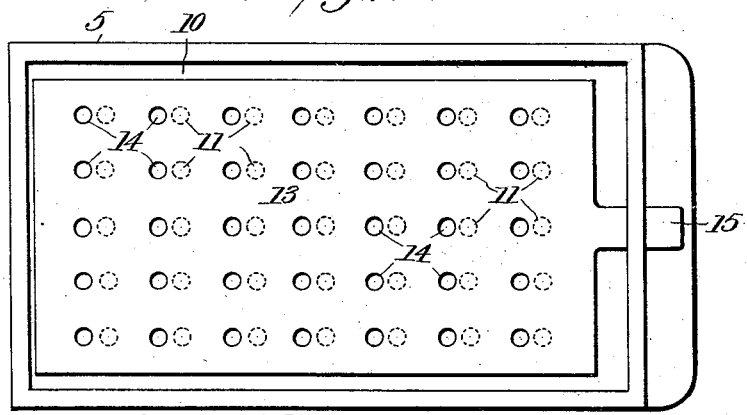
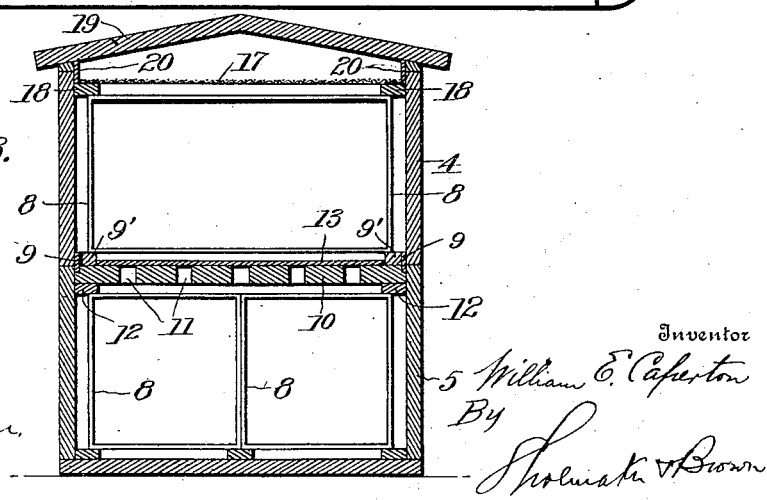

UNITED STATES PATENT OFFICE.

WILLIAM ELSON CAPERTON, OF McGREGOR, TEXAS.

BEE-GUM.

No. 870,274.     Specification of Letters Patent.     Patented Nov. 5, 1907.

Application filed May 15, 1907. Serial No. 373,762.

*To all whom it may concern:*

Be it known that I, WILLIAM ELSON CAPERTON, a citizen of the United States, residing at McGregor, in the county of McLennan and State of Texas, have invented certain new and useful Improvements in Bee-Gums, of which the following is a specification.

This invention relates to bee hives.

One object of the invention is to provide a bee hive constructed and arranged to remove the honey from the hive without injury by excited bees.

Another object of the invention resides in the provision of a bee hive embodying such characteristics that the bees may be compelled to move from one compartment to another to permit of access to the honey frames without liability of danger of being attacked by the bees.

A still further object of the invention resides in the provision of a bee hive whose construction is such that the hive will be efficiently ventilated and also properly protected from rain.

It is still further designed to provide a bee hive of such construction that the bees may be closed within the hive at the will of an attendant and whereby the bees may be permitted to travel or move from one place to another in each compartment as well as from one compartment to another.

With the above and other objects in view the present invention consists in the combination and arrangement of parts hereinafter more fully described, illustrated in the accompanying drawings and particularly pointed out in the appended claims, it being understood that changes may be made in the form, proportion, size and minor details without departing from the spirit or sacrificing any of the advantages thereof.

In the drawings:—Figure 1 is a longitudinal sectional view of the bee hive or gum. Fig. 2 is a top plan view of the lower compartment with the upper compartment removed. Fig. 3 is a transverse sectional view of the bee hive.

Referring now more particularly to the accompanying drawings the reference characters 4 and 5 indicate upper and lower compartments, respectively, the latter having a door opening 6 at its front end to permit of the passage of the bees. When desired the door opening may be closed by the door 7. Each compartment is adapted to receive spaced honey combs or frames 8, as shown.

The frames 8 of the lower compartment are arrranged in double sets or series and preferably spaced from the bottom and sides thereof to permit the bees to pass between the frames. In the upper compartment the frames are shown in single series and larger than the frames of the lower compartment. The upper frames rest upon the strips 9' which may be secured to or merely placed upon the partition member 10 adjacent the sides of the upper partition member 13.

To firmly connect the upper and lower compartments removably together I provide the lower edge of the upper compartment with a cleat 9 adapted to fit within the upper edge of the lower compartment and in order to provide the upper and lower compartments I employ a removable partition member 10 having perforations 11 and provided upon its lower edges with a cleat 12 designed to rest upon the tops of the frames or combs 8 of the lower compartment to provide a space between the frames and combs and the under face of said partition member to permit of the passage or travel of the bees between the frames at the tops thereof. This partition member 10 may be formed of wood or any other suitable material and slidably mounted upon it is a coöperating partition member 13 provided with perforations 14 adapted to be brought into and out of alinement with the perforations 11 of the first mentioned partition member 10 so that the bees may be permitted to pass from one compartment to the other or securely confined within either of the compartments. It will be seen that the upper partition member 13 is shorter than the lower member 10 so that the handle part 15, which works in the slot 16 of the upper compartment may be grasped to move the upper member 13 longitudinally of the hive to bring the perforations of the partition members into and out of alinement.

Arranged within the upper compartment near the top thereof is a foraminated frame 17 whose cleats 18 rest upon the tops of the frames or combs in the upper compartment 4, as best shown in Fig. 3, to permit the bees to travel between the upper frames at the tops thereof.

Disposed immediately above the foraminated frame 17 is the top 19 of the hive, which has depending cleats 20 designed to engage the inner edges of the upper compartment at the top of the latter to prevent accidental displacement of the top, as clearly shown in the drawings.

When the honey is to be removed from the hive, the entrance 6 is closed by the sliding door 7. The top 19 of the hive is removed and smoke is driven or blown down through the foraminated frame 17 prompting all of the bees to seek refuge in the lower compartment 5. The upper or slidable partition member 13 is then moved to prevent communication between the compartments through the perforations of the division or partition members and whereby the bees are shut in the lower compartment. The upper compartment 4 may then be removed and a new one put on or the frames containing the honey may be removed from the upper compartment and new frames substituted therefor, when the bees may be set at liberty to go to work again.

By reason of the fact that my improved hive is made up of detachable sections, it is obvious that additional sections may be employed with the two sections herein described and that if preferred, the upper section 4 may be eliminated entirely by substituting the foraminated frame 17 for the partition members 10 and 13 with the foraminated frame 17 and the use of the cover or top member 19 fitted upon the lower compartment over the foraminated frame. For ventilating purposes the top may be removed.

From the foregoing it will be appreciated that I have provided an exceedingly simple, inexpensive, durable and efficient bee hive or gum and I claim that I have made a decided forward step in bee culture.

What is claimed is:—

1. A bee hive comprising upper and lower compartments removably connected together, a perforated member removably mounted within the lower compartment at the top of the latter, the upper compartment having a slot in one end near its lower edge, a perforated slide mounted upon the aforesaid perforated member for movement to open and close the perforations of the latter, said slide having a reduced end to form a handle for movement through said slot, the reduced end of the slide also forming shoulders to engage the slotted end of the upper compartment to limit the outward movement of the slide, a foraminated member at the top of the upper compartment, a removable top member fitted upon the upper compartment in spaced relation to the foraminated member, the lower compartment having an opening in one end, and a closure slidably mounted over said opening.

2. A bee hive comprising upper and lower compartments removably connected together, a perforated member forming a partition between the upper and lower compartments, a perforated slide mounted upon said perforated member for movement to open and close the perforations of the latter, the sides and ends of the upper compartment alining with the sides and ends of the lower compartment and the upper compartment having depending cleats along its lower edges for engagement with the upper inner edges of the lower compartment to prevent accidental displacement of one compartment with respect to the other, comb frames mounted in both compartments, a foraminated member supported within the upper compartment upon the comb frames of the latter, and a top member disposed upon the upper compartment and having its sides and ends arranged in alinement with the sides and ends of the compartment and also provided with depending cleats upon the lower inner edges of its sides and ends for engagement with the upper inner edges of the sides and ends of the upper compartment to prevent accidental displacement of said top member with respect to said upper compartment.

In testimony whereof I affix my signature, in presence of two witnesses.

WM. ELSON CAPERTON.

Witnesses:
W. H. EANES,
R. D. BYROM.